UNITED STATES PATENT OFFICE.

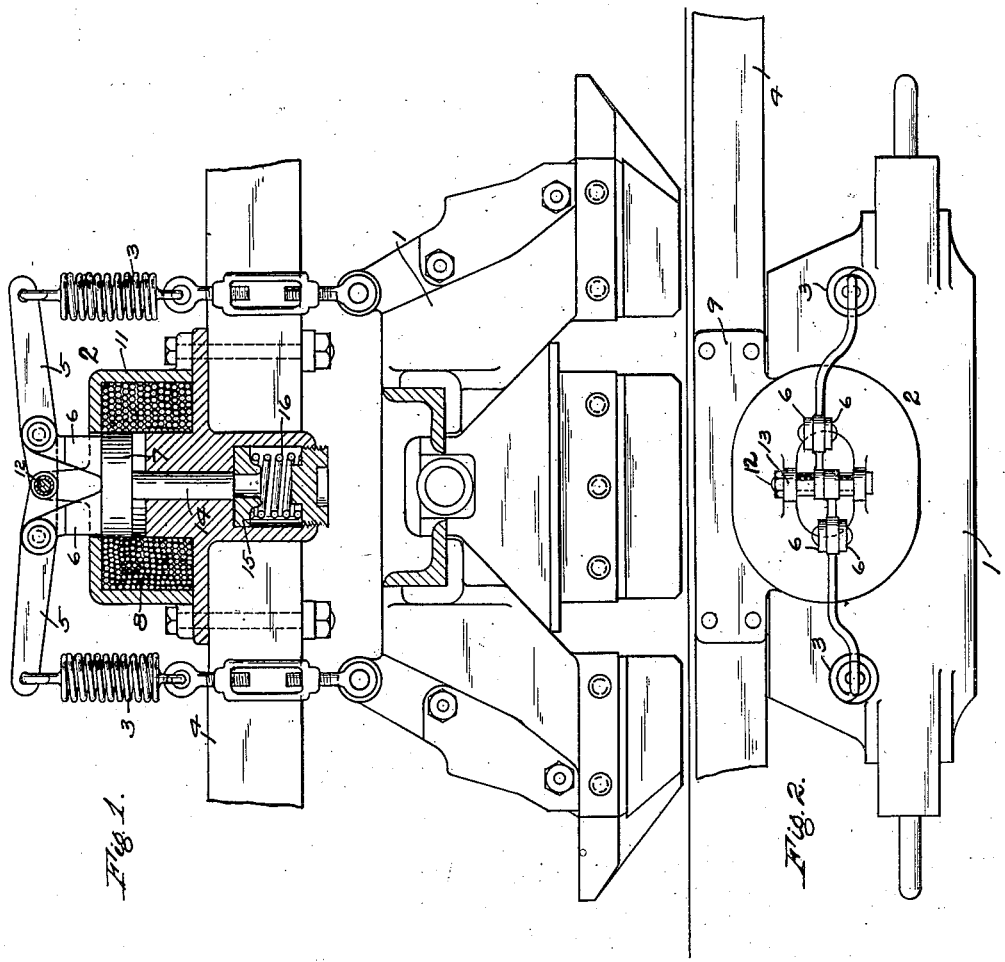

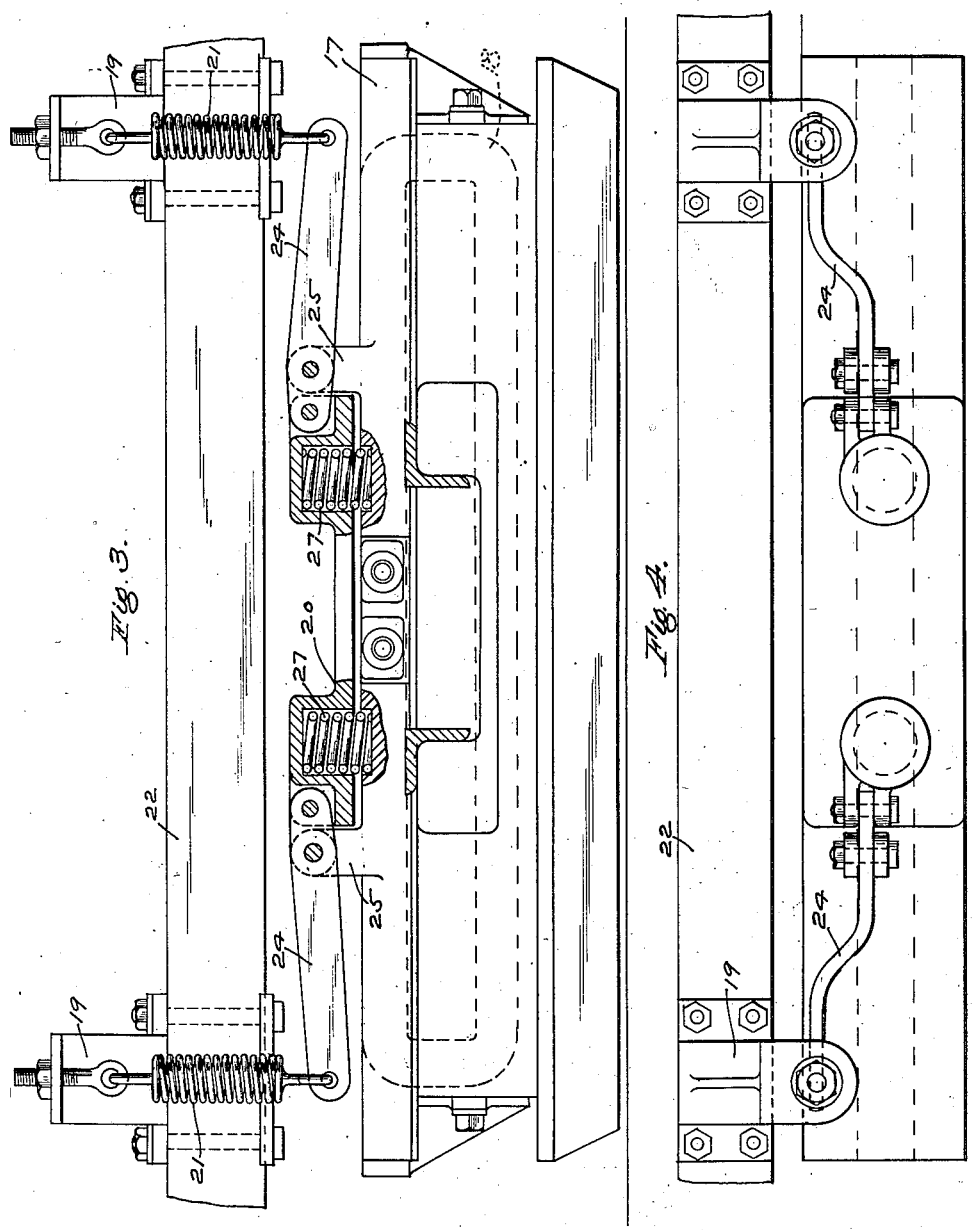

JOSEPH N. MAHONEY AND OSCAR S. McCURDY, OF WILKINSBURG, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

MAGNETIC BRAKE DEVICE.

977,111.   Specification of Letters Patent.   Patented Nov. 29, 1910.

Application filed April 20, 1908. Serial No. 428,165.

*To all whom it may concern:*

Be it known that we, JOSEPH N. MAHONEY and OSCAR S. McCURDY, citizens of the United States, residing at Wilkinsburg, in the county of Allegheny and State of Pennsylvania, have invented a certain new and useful Improvement in Magnetic Brake Devices, of which the following is a specification.

Our invention relates to magnetic railway brakes, and more particularly to those wherein the brake shoe is normally suspended away from the rail or other friction engaging surface, and is adapted, upon sending a current of electricity through the brake shoe magnet coil, to be attracted to the rail and thereby act as a brake to check the speed of the vehicle.

With this form of brake, whenever the normal minimum clearance space or air gap between the brake shoe and rail or friction surface is increased, as is liable to occur by reason of the continual wearing away of the brake shoe and subsequent failure to adjust the shoe to take up for the wear, a much greater current is required in order to get the brake shoe down to the rail than is necessary to effect the proper braking action, so that the brake shoe causes a brake application of greater force than desired.

The principal object of our invention is, therefore, to provide means, operating independently of the magnetic attraction between shoe and friction engaging surface upon initial flow of current in the brake circuit, to bring the brake shoe down to the friction engaging surface.

In the accompanying drawings; Figure 1 is a side elevation of one form of magnetic brake embodying our improvements; Fig. 2 a top plan view thereof; Fig. 3 a side elevation of another form of magnetic brake, showing our invention applied thereto; and Fig. 4 a top plan view of same.

The general construction illustrated in Figs. 1 and 2 of the drawings is similar to that covered in Reissue Patent No. 11,786, dated Nov. 7, 1899, and comprises a magnetic rail brake shoe 1, suspended above the rail by spring 3, so that in the normal release position a certain clearance space or air gap is left between shoe and rail. In applying the brake, the brake shoe is brought down to the rail by magnetic attraction and then by its dragging action operates as a brake directly, and in addition, as there described, the dragging action may be utilized to apply the wheel brakes.

According to our invention the brake shoe 1 is normally suspended in release position from levers 5, to the outer ends of which the brake shoe suspension springs 3 are attached, and having their inner ends pivotally mounted on a fixed pin 12 secured in lugs 13. At points intermediate the ends, said levers 5 are pivotally connected by means of lugs 6, to a movable core or armature 7 of an electro-magnet 2, which may be mounted on a supporting bracket 9 suitably secured to the truck frame 4. The core or armature 7 is mounted within the coil or winding 8 of electro-magnet 2 and is provided with a downwardly extending stem 14, at the lower end of which is a spring plate 15 by which the pressure of a spring 16 is transmitted to the stem 14. The spring 16 is of sufficient tension to support the weight of the brake shoe and connected parts above the rail in normal release position.

If it is desired to make an application of the brakes, the braking controller is turned to the first braking position, the magnet coil 8 being connected up so as to receive current in this position, either by way of a shunt circuit of the braking circuit or by direct supply from another source of current, so that current flows through the coil 8 and thereby causes the armature 7 to be attracted inwardly, overcoming the resistance of the spring 16. The outer ends of the levers 5 are thus swung downwardly and the brake shoe 1 is brought to the rail. The full effect of whatever current is flowing through the brake magnet coils is thus utilized in braking, as the brake shoes are in engagement with the rails, and thereafter the braking force may be increased as desired, by the usual movements of the braking controller, so that a smooth gradual application of the brakes may be produced. The ratio of the arms of the levers 5 are preferably such that a slight movement of the armature 7 is sufficient to cause considerable movement of the brake shoe, as by this means a correspondingly light flow of current through the magnet coil 8 serves to actuate the armature and brake shoe. The magnet coil 8 may be inclosed in a protecting casing 11, to which the fulcrum lugs 13 for the levers 5 may be secured.

In Figs. 3 and 4 of the drawings, our improvements are shown applied to a magnetic brake of the type having magnet pole pieces arranged parallel with the rail, the magnetic circuit having a direction transversely through the rail instead of longitudinally thereof, as in the first described construction. In this case, the construction comprises a magnetic brake shoe 17, having a coil 18 wound longitudinally of the rail, the shoe being suspended over the rail by springs 21 secured to brackets 19 which may be mounted on the truck frame 22. The springs 21 are operatively connected to the brake shoe 17 by levers 24 which are fulcrumed in lugs 25 on said shoe, and the inner ends of the levers are pivotally secured to an armature plate 20.

Intermediate the shoe and armature, springs 27 are interposed, of sufficient tension to normally maintain the levers 24 in a position to hold the shoe away from the rail. Upon sending a current of electricity through the magnet coil 18, the immediate effect is to attract the armature 20 to the brake shoe, overcoming the resistance of the springs 27, and thereby causing the brake shoe to move downwardly and engage the rail surface, as in the first described construction.

With this construction, it will be seen that an additional shoe actuating magnet coil is dispensed with, by utilizing the magnetic action of the braking coil itself.

It will now be apparent that with our invention, the magnetic brake shoe is positively brought into engagement with the rail upon the initial flow of current, regardless of the extent of shoe clearance or air gap, so that the motorman is at all times enabled to fully control the degree of braking force, and undesired excessive brake applications are avoided.

Having now described our invention, what we claim as new and desire to secure by Letters Patent, is:—

1. In a car brake, the combination with a magnetic brake shoe adapted upon engagement with a friction surface to cause braking action, of electrically governed means for moving said shoe into engagement with the friction surface.

2. In a car brake, the combination with a magnetic brake shoe adapted upon engagement with a friction surface to cause braking action, of electrically controlled means for positively moving said shoe to engage said friction surface.

3. In a car brake, the combination with a magnetic brake shoe adapted by frictional engagement with a rail to produce braking action, of means operating independently of the magnetic attraction between shoe and rail in the act of applying the brakes, for bringing the shoe into engagement with the rail.

4. In a car brake, the combination with a magnetic brake shoe adapted by frictional engagement with a rail to produce braking action, of electrically operated means, independent of the magnetic attraction between shoe and rail in the act of applying the brakes, for causing the shoe to engage the rail.

5. In a car brake, the combination with a magnetic brake shoe adapted by frictional engagement with a rail to produce braking action, of means operating upon the initial flow of current in applying the brake, to cause the shoe to engage the rail.

6. In a car brake, the combination with a magnetic brake shoe, adapted to engage a friction surface to apply the brakes, of means adapted in release position to hold said shoe out of engagement with the friction engaging surface and operated by the flow of electric current to cause said shoe to engage the friction surface.

7. In a car brake, the combination with a magnetic brake shoe adapted by frictional engagement with a rail to produce braking action, of a spring for maintaining said shoe out of engagement with the rail in normal release position, and electrically operated means for moving the shoe to the rail upon applying the brakes.

8. In a car brake, the combination with a magnetic brake shoe adapted by frictional engagement with a rail to produce braking action, of a spring for maintaining said shoe out of engagement with the rail in normal release position, and electrically operated means acting in opposition to said spring for moving the shoe to the rail upon applying the brakes.

9. In a car brake, the combination with a magnetic brake shoe adapted by frictional engagement with a rail to produce braking action, of a spring for maintaining said shoe out of engagement with the rail in normal release position, and means operating upon the initial flow of current in applying the brakes, for causing said shoe to engage the rail.

10. In an electro-magnetic brake device, the combination with a magnetic brake shoe, of electrically controlled means, acting independently of the magnetic attraction between said shoe and the engaging surface for the shoe, for moving the shoe in one direction and means tending to move the shoe in the opposite direction.

11. In an electro-magnetic brake device, the combination with a magnetic brake shoe, of electrically controlled means, acting independently of the magnetic attraction between said shoe and the engaging surface for the shoe, for moving the shoe in one direction and yielding spring means tending to move the shoe in the opposite direction.

12. In an electro-magnetic car brake, the combination with a magnetic brake shoe adapted to be suspended above the rail and operated by magnetic attraction for producing braking action, of a spring mechanism tending to maintain said shoe out of engagement with the rail and means operated by magnetic attraction for causing the shoe to engage the rail.

13. In an electro-magnetic car brake, the combination with a magnetic brake shoe, of a spring mechanism for normally suspending the brake shoe above the rail and a solenoid adapted upon energization to oppose the action of the spring mechanism and thereby effect the engagement of the shoe with the rail.

14. In an electro-magnetic car brake, the combination with a magnetic brake shoe, of pivoted levers carrying said shoe, a solenoid having an armature operatively connected to said levers, and tending upon energization to move the shoe in the direction of the rail, and a spring acting to lift the shoe from the rail.

In testimony whereof we have hereunto set our hands.

JOSEPH N. MAHONEY.
OSCAR S. McCURDY.

Witnesses:
R. F. EMERY,
WM. M. CADY.